(12) United States Patent
Moon et al.

(10) Patent No.: US 6,408,906 B1
(45) Date of Patent: Jun. 25, 2002

(54) GRIPPING AND CUTTING APPARATUS

(75) Inventors: Thomas A. Moon, Lena; Gary D. Riha, Green Bay, both of WI (US)

(73) Assignee: Innotec Engineering, Inc., Lena, WI (US)

( * ) Notice: Subject to any disclaimer, the term of this patent is extended or adjusted under 35 U.S.C. 154(b) by 0 days.

(21) Appl. No.: 09/550,256

(22) Filed: Apr. 14, 2000

(51) Int. Cl.$^7$ .............................................. A01G 23/095
(52) U.S. Cl. .................... 144/24.13; 144/4.1; 144/34.1; 144/336; 144/338
(58) Field of Search ......................... 83/743, 788, 795; 144/336, 338, 4.1, 24.13, 34.1

(56) References Cited

U.S. PATENT DOCUMENTS

| | | |
|---|---|---|
| 3,566,935 A | 3/1971 | Wilds |
| 3,620,272 A | 11/1971 | Eriksson et al. |
| 3,664,391 A | 5/1972 | Coffey |
| 3,688,816 A | 9/1972 | Runeson |
| 3,924,667 A | 12/1975 | McKenzie |
| 4,013,106 A | 3/1977 | Albright |
| 4,034,785 A | 7/1977 | Tucek |
| 4,194,542 A | 3/1980 | Eriksson |
| 4,244,405 A | 1/1981 | Zirker et al. |
| 4,269,241 A | 5/1981 | Hickman |
| 4,274,457 A | 6/1981 | Nilsen |
| 4,347,880 A | 9/1982 | van der Merwe |
| 4,413,661 A | 11/1983 | Marchildon |
| 4,522,239 A | 6/1985 | Gaitten |
| 4,569,379 A | 2/1986 | Gemmell-Murdoch |
| 4,781,228 A | 11/1988 | Vaders |
| 4,981,163 A | 1/1991 | Westlund |
| 5,129,438 A | 7/1992 | Hamilton |
| 5,201,350 A | 4/1993 | Milbourn |
| 5,215,202 A * | 6/1993 | Fujimoto .................... 212/232 |
| 5,293,914 A | 3/1994 | Hudson |
| 5,318,081 A | 6/1994 | Parkhurst |
| 5,378,852 A | 1/1995 | Manor |
| 5,390,715 A | 2/1995 | Luscombe |
| 5,501,257 A | 3/1996 | Hickman |
| 5,509,154 A | 4/1996 | Shafer et al. |
| 5,568,829 A | 10/1996 | Crawford et al. |
| 5,727,610 A * | 3/1998 | Isley .......................... 144/4.12 |
| 5,903,941 A | 5/1999 | Shafer et al. |
| 5,908,060 A * | 6/1999 | Fargeot ...................... 144/4.12 |
| 5,975,166 A * | 11/1999 | MacLennan ................ 144/4.12 |
| 5,995,893 A * | 11/1999 | Lee et al. ...................... 701/50 |
| 6,123,124 A * | 9/2000 | Naud .......................... 144/4.12 |
| 6,135,175 A * | 10/2000 | Gaudreault et al. ......... 144/4.12 |

* cited by examiner

Primary Examiner—Ed Tolan
(74) Attorney, Agent, or Firm—Alan Kamrath; Rider, Bennett, Egan & Arundel, LLP

(57) ABSTRACT

Apparatus (10) having special application for gripping and cutting tree limbs around utility lines includes a tubular insert (18) slideably received in the free end of a tubular boom (12). A plate (28) is pivoted about a first pivot axis relative to the insert (18) by a linearly extendable actuator (36) mounted within the insert (18) and mounts a first rotary actuator (38). A second rotary actuator (58) is mounted to a U-shaped mount (48) which is pivoted about a second pivot axis to the first rotary actuator (38) and rotates a working head (96) 360° about a third pivot axis. Gripping arms (78) are fixed to shafts (74) rotatably mounted in the working head (96) about axes perpendicular to the third axis, with the shafts (74) being rotated by a single linearly extendable actuator (82) extending between crank arms (80) fixed to the shafts (74). The crank arms (80) abut with an abutment (84) to prevent only one set of gripping arms (78) from moving. An untethered remote control unit (112) is provided to prevent the creation of an electrical path to ground through the operator. A solar and battery-powered transmitter (144) mounted on the head (96) sends an electromagnetic signal to prevent actuation of the valves (101–103) controlling the operation of the boom assembly (14) when the saw bar (88) is not in its home position.

30 Claims, 4 Drawing Sheets

GRIPPING AND CUTTING APPARATUS

BACKGROUND

The present invention generally relates to apparatus for gripping and cutting wood in the form of trees or poles, particularly relates to gripping and cutting apparatus for mounting on the end of a boom of a boom assembly, and specifically relates to gripping and cutting apparatus for mounting on the end of a fiberglass boom of a boom assembly.

In the utility industry, it is necessary to trim tree limbs which have a possibility of interference with utility lines. Typically, trimming is performed by a person located in a bucket hoisted adjacent to the tree limbs and using a severing means to trim the desired limbs. In order to trim such tree limbs, the operator in the bucket must get into close proximity with the utility lines, which presents electrocution risks in the case of high power lines. To reduce the risk of electrocution in the event of accidental contact with power lines, at least one of the booms of the boom assembly is formed of fiberglass which is a poor electrical conductor compared to metal but which has a reduced load carrying capability than booms formed of metal. In addition, the limbs are often not in a position to be dropped to the ground after severance because of interference with the lines. Especially for bucket trucks having fiberglass booms having limited load carrying capabilities, as the operator's weight is carried by the fiberglass boom, the operator is not allowed to rest or otherwise support the severed limb on the bucket as the boom assembly is not designed for this type of load. Thus, the operator often has to tie off the limb to a higher limb using a series of ropes and to then lower the limb to the ground. This is a time-consuming process and puts the operator in danger around power lines.

Boom carried tree pruning apparatus are known in the art, but mostly in the commercial tree growing industry and not in the utility industries. In particular, most prior, commercially available tree pruning apparatus are of a size and weight required to be carried by massive boom assemblies and vehicles and in particular are not of a design capable of being attached to and/or carried by boom assemblies formed of fiberglass. Thus, the expense of and limited versatility of the vehicles and boom assemblies prevented the market acceptance of such apparatus in the utility industries. Further, because of their relatively large mass and/or their inability to be attached to fiberglass booms, prior tree pruning apparatus were attached on metal boom assemblies which are electrically conductive. This significantly increased the risk of electrocution of the operator and people nearby. Furthermore, the controls for the boom carried tree pruning apparatus were mounted to the vehicle such that the operator often created an electrical path to ground which increased the risk of electrocution. Also, as tree limbs are at varying angles, viewing movement and operation of the boom carried tree pruning apparatus was often obstructed to the operator of the controls. Additionally, although many attempts have been made to solve the need for tree pruning apparatus for the utility industries, such prior attempts have suffered from various deficiencies which are believed to have prevented their market viability.

Thus, a need continues to exist for apparatus for gripping and cutting wood which is advantageous, especially when used in the utilities industries, and which overcomes the deficiencies and shortcomings of prior apparatus.

SUMMARY

The present invention solves this need and other problems in the field of gripping and cutting apparatus by providing, in the preferred form, a gripping assembly including an extendable actuator having opposite ends pivotally mounted to crank arms extending radially from first and second shafts each having at least one gripping arm extending radially therefrom. The travel of the crank arms is limited by abutting with an abutment so that movement of the gripping arms is centered on the gripping head.

In other aspects of the present invention, the opposite ends of an extendable actuator are pivotably mounted to actuator ears within a tubular insert and to actuator ears of a mount pivotally mounted to the tubular insert, with the tubular insert being glued or similarly adhered within the tubular boom of a boom assembly. Thus, the insert provides a rigid mounting surface for the actuator when utilized for booms formed of fiberglass or other material which provides an inadequate medium for mounting the actuator as well as provides a cleaner, more compact package having a reduced tendency to catch on tree limbs, utility wires, and the like.

In further aspects of the present invention, the gripping and cutting assembly is mounted to the free end of a boom of a boom assembly for pivotable movement about a first axis, a second axis substantially perpendicular to the first axis, and a third axis substantially perpendicular to the first and second axes. In most preferred aspects of the present invention, the gripping and cutting assembly is rotated by a first rotary actuator received between the end plates of a U-shaped leveler mount and by a second rotary actuator mounted between the central plate of the U-shaped leveler mount and a head mount, with the gripping and cutting assembly being rotatable 360° about the second rotary actuator.

In still further aspects of the present invention, the operation of a gripping and cutting apparatus mounted to a boom assembly is controlled utilizing a remotely operated control unit which is not connected to the vehicle to which the boom assembly is mounted in a manner which creates an electrical path and in the most preferred form is untethered to maximize the possibilities of potential operator positions and to minimize the risk of electrocution.

In additional aspects of the present invention, operation of the boom assembly is prevented when the saw bar is not in a home position and is thus most prone to damage. In the most preferred form of the present invention, a proximity switch on the cutting apparatus actuates a transmitter which provides an electromagnetic signal to a receiver at the base of the boom assembly for interlocking valve actuation of the boom assembly when the saw bar is not in its home position.

It is thus an object of the present invention to provide a novel apparatus for gripping and cutting wood.

It is further an object of the present invention to provide such a novel gripping and cutting apparatus especially adapted for fiberglass boom assemblies.

It is further an object of the present invention to provide such a novel gripping and cutting apparatus including an insert for receipt within a tubular boom and for providing an inside rigid mounting surface for an extendable actuator.

It is further an object of the present invention to provide such a novel gripping and cutting apparatus which does not create an electrical path to the remote control unit.

It is further an object of the present invention to provide such a novel gripping and cutting apparatus including an untethered remote control unit.

It is further an object of the present invention to provide such a novel gripping and cutting apparatus including a mechanical abutment to center the travel of the gripping arms in a gripping head.

It is further an object of the present invention to provide such a novel gripping and cutting apparatus providing pivotal movement of the gripping head about three perpendicular pivotable movement axes.

It is further an object of the present invention to provide such a novel gripping and cutting apparatus which locks out boom operation when the saw bar is not in its home position.

These and further objects and advantages of the present invention will become clearer in light of the following detailed description of an illustrative embodiment of this invention described in connection with the drawings.

BRIEF DESCRIPTION OF THE DRAWINGS

The illustrative embodiment may best be described by reference to the accompanying drawings where:

FIG. 4 shows a top plan view of the remote control unit of the gripping and cutting apparatus of FIG. 1.

Figure 1:
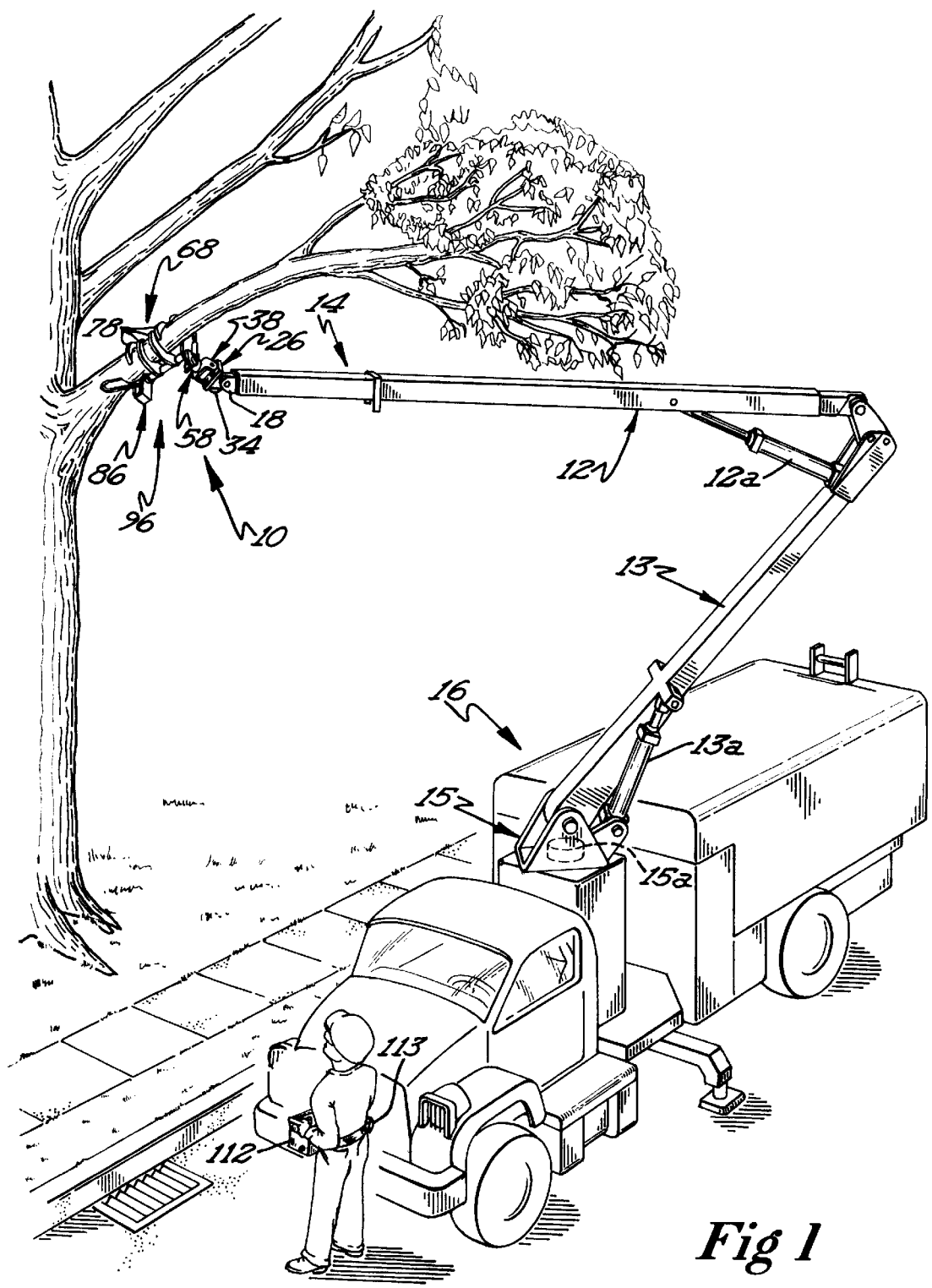
FIG. 1 shows a perspective view of a gripping and cutting apparatus fabricated in accordance with the preferred teachings of the present invention mounted on the end of a boom assembly mounted on a powered vehicle.
Figure 2:
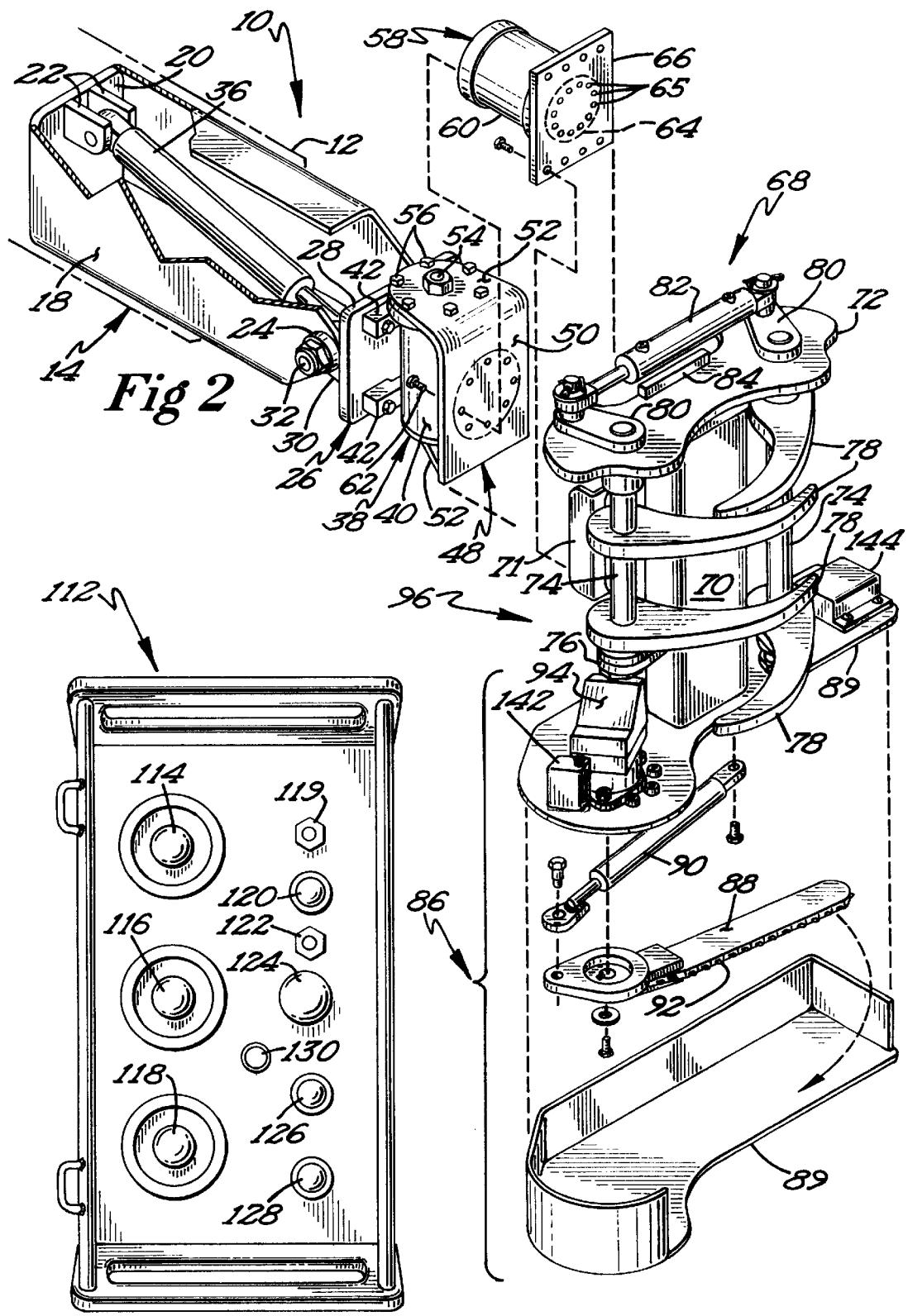
FIG. 2 shows an exploded, perspective view of the gripping and cutting apparatus of FIG. 1.
Figure 3:
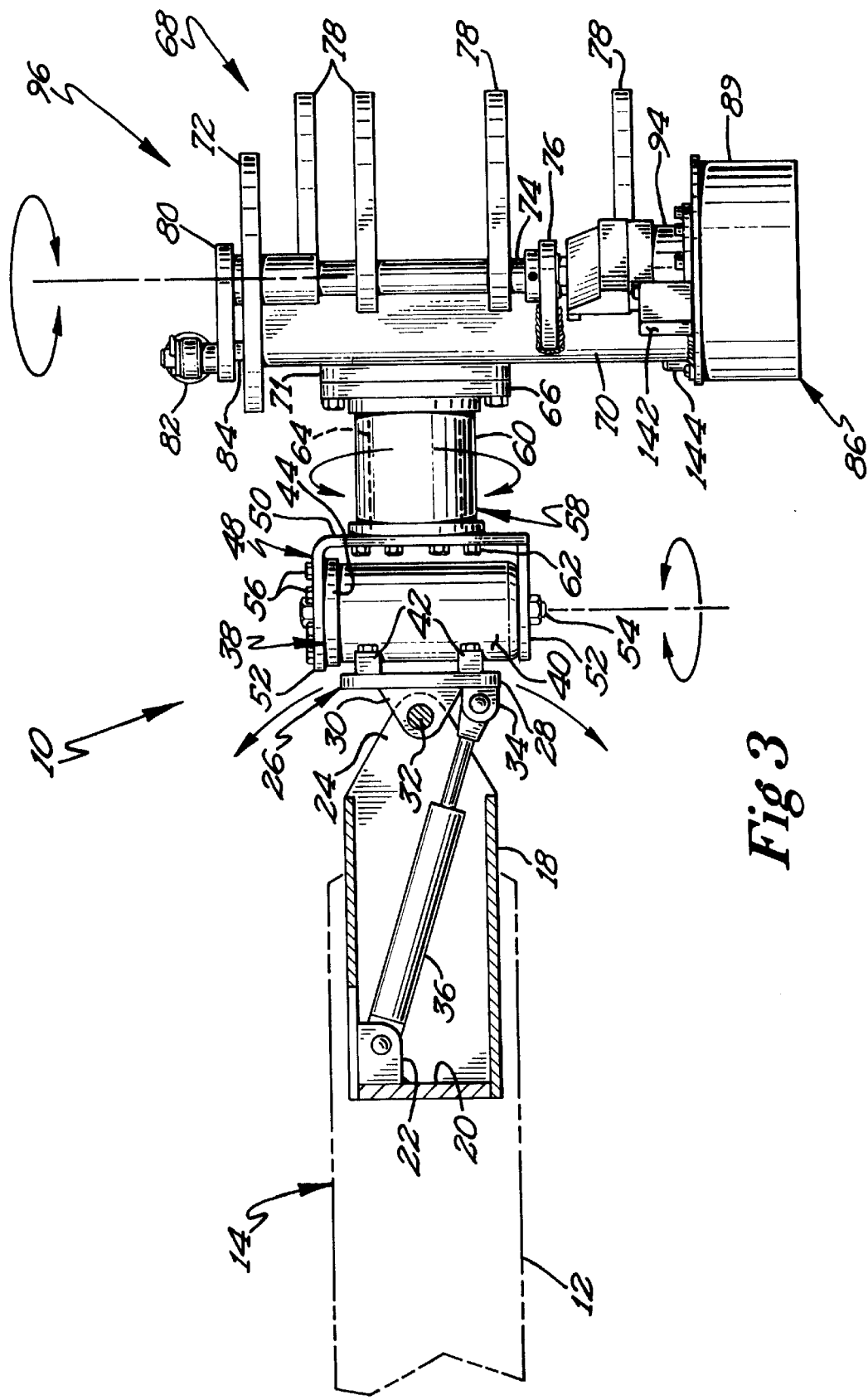
FIG. 3 shows a side view of the gripping and cutting apparatus of FIG. 1, with portions shown in cross section to show internal detail.
Figure 5:
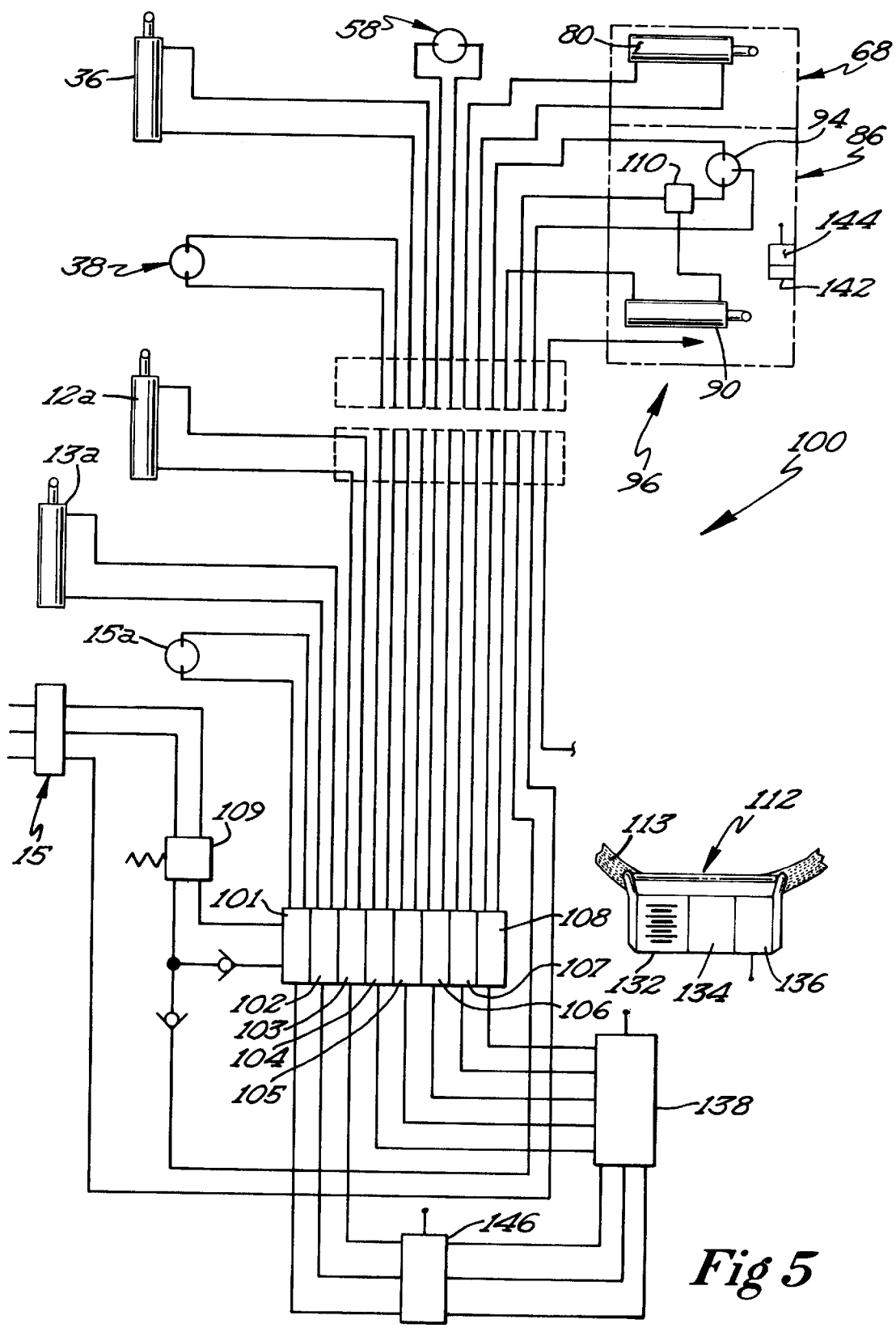
FIG. 5 shows a diagrammatic view of the control system of the gripping and cutting apparatus of FIG. 1.

All figures are drawn for ease of explanation of the basic teachings of the present invention only; the extensions of the Figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "top", "bottom", "first", "second", "side", "end", "inner", "outer", "inside", "outside", "upper", "lower", and similar terms are used herein, it should be understood that these terms have reference only to the structure shown in the drawings as it would appear to a person viewing the drawings and are utilized only to facilitate describing the preferred embodiment.

DESCRIPTION OF THE PREFERRED EMBODIMENT

Gripping and cutting apparatus according to the preferred teachings of the present invention is shown in the drawing and generally designated 10. In the most preferred form, apparatus 10 is mounted on the free end of an upper boom 12 of a boom assembly 14 mounted on a powered vehicle 16, with boom 12 being tubular and having annular cross sections. In the most preferred form, boom assembly 14 includes a lower boom 13 having its upper end pivotally attached about a horizontal axis to the lower end of boom 12 and its lower end pivotally attached about a horizontal axis to a turntable 15 rotatable about a vertical axis. A hydraulic actuator 12a having its opposite ends pivotally connected to booms 12 and 13 pivots boom 12 relative to boom 13. A hydraulic actuator 13a having its opposite ends pivotally connected to boom 13 and turntable 15 pivots boom 13 relative to turntable 15. A hydraulic motor 15a is mounted to turntable 15 to rotate turntable 15 relative to vehicle 16. In the most preferred form, vehicle 16 and boom assembly 14 are of a conventional design referred to in the trade as a bucket truck utilized extensively in the utilities industry. In its most preferred aspect, at least boom 12 is formed of fiberglass to reduce the risk of electrocution in the event of contact with electrical lines. In particular, boom 12 is in the form of a fiberglass tube. It should be appreciated that the use of fiberglass in boom assembly 14 in addition to the reduction of electrocution risk has advantages including being of reduced weight and expense, but has limitations including strength and specifically in load carrying capacity.

Apparatus 10 in the preferred form includes a boom insert 18 in the form of a tube having an outer surface having annular cross sectional sizes corresponding to and for a tight slideable fit within the free end of boom 12. In the most preferred form, the outer surface of insert 18 is glued such as by epoxy glue or similarly adhered in boom 12. Insert 18 includes an end plate 20 secured to and closing an end of insert 18, with actuator ears 22 secured in insert 18 by extending from end plate 20 inside of insert 18 and spaced from the outer end of insert 18. The outer end of insert 18 forms and terminates in pivot ears 24 located outside of boom 12. In the most preferred form, the hydraulic fittings for apparatus 10 are carried by boom insert 18 outside of boom 12.

Apparatus 10 in the most preferred form further includes a rotator mount 26 having a plate 28 from which pivot ears 30 extend perpendicularly from a face thereof intermediate its upper and lower edges. Mount 26 is pivotably mounted to insert 18 by a pivot pin 32 extending through pivot ears 24 and 30. Mount 26 further includes actuator ears 34 extending parallel to pivot ears 30. In the most preferred form, mount 26 is pivoted relative to insert 18 and thus boom 12 by a linearly extendable hydraulic actuator 36 extending within the interior of insert 18 and having its opposite ends pivotably mounted to ears 22 and 34 about pivot axes spaced from and parallel to each other and the pivot axis defined by pivot pin 32. Thus, extension and retraction of actuator 36 results in pivotable movement about a first pivot axis defined by pivot pin 32 relative to boom assembly 14.

Apparatus 10 further includes a rotary hydraulic actuator 38 in the most preferred form having a cylindrical body 40 suitably mounted to mount 26 such as by tangential legs 42 fixed to body 40 and suitably removably secured to plate 28 on the opposite face than ears 30. Rotary actuator 38 includes a circular plate output 44, with an axial opening extending through output 44 and body 40.

Apparatus 10 further includes a leveler mount 48 of a generally U-shape. Specifically, mount 48 includes a central plate 50 and first and second end plates 52 extending generally perpendicularly from the opposite ends of plate 50. The spacing between end plates 52 is generally equal to and for slideably receiving actuator 38. Actuator 38 in the preferred form is rotatably mounted between plates 52 by an elongated pin 54 extending through apertures formed in end plates 52 and through the axial opening extending through output 44 and body 40. Output 44 is suitably secured to leveler mount 48 such as by bolts 56 extending through end plate 52 adjacent to output 44 and threadably received in output 44. Thus, rotation of output 44 relative to body 40, legs 42, and mount 26 results in rotation of mount 48 about a second pivot axis defined by pin 54 relative to body 40, legs 42, mount 26 and boom assembly 14. It should be appreciated that the second pivot axis defined by pin 54 is perpendicular to the first pivot axis defined by pivot pin 32.

Apparatus 10 further includes a rotary hydraulic actuator 58 in the most preferred form having a cylindrical body 60 suitably mounted to central plate 50 of mount 48 such as by bolts 62 passing through plate 50 and threaded into body 60 and having a rotatable central core 64. A head mount 66 is suitably secured to core 64 such as by bolts 65 extending through mount 66 and threadably received in core 64. Thus, rotation of core 64 relative to body 60 results in rotation of mount 66 about a third pivot axis defined by core 64 relative to body 60, mount 48 and boom assembly 14. It should be appreciated that the third pivot axis defined by core 64 is perpendicular to the first. and second axes pivot defined by pins 32 and 54, respectively.

Apparatus 10 further includes a gripping arm assembly 68 having a main support 70 including a mount 71 which can suitably be secured to head mount 66 such as by bolts. An end plate 72 is suitably secured to one end of support 70 such as by. countersunk cap screws, with support 70 extending perpendicularly from plate 72. First and second shafts 74 extend through apertures formed in plate 72 and are rotatably mounted thereby about pivot axes which are spaced and parallel to each other and on opposite sides of and parallel to support 70 between plate 72 and lower pivot brackets 76 suitably fixed relative to support. 70 such as by welding to support 70. Each of the shafts 74 include first and second gripping arms 78 fixed thereto for rotation therewith. In the most preferred form, arms 78 of the first shaft 74 are located axially between arms 78 of the second shaft 74 such that the first shaft 74 can be axially shorter than the second shaft 74. Shafts 74 and arms 78 are spaced axially inwardly from the end of support 70 opposite to plate 72. It can then be appreciated that the third pivot axis defined by core 64 extends generally perpendicular to the plane extending between the pivot axes of first and second shafts 74.

For purposes of pivoting shafts 74 and gripping arms 78, the free ends of shafts 74 extending through plate 72 each include a crank arm 80 extending radially from shafts 74. Thus, plate 72 is located intermediate arms 78 and 80. A single, linearly extendable hydraulic actuator 82 has its opposite ends pivotably mounted to crank arms 80 about pivot axes which are spaced and parallel to each other and to the pivot axes of shafts 74. An abutment 84 is suitably secured to plate 72 equidistant between but in a plane parallel to but spaced from a plane extending between the pivot axes of shafts 74, with abutment 84 abutting with both crank arms 80 when actuator 82 is in its retracted position to limit travel of crank arms 80 and rotational movement of shafts 74. Arms 78 are located and shaped in such a way to give a range of motion by a single actuator 82 to grab limbs effectively from a 12 inch (30 cm) maximum diameter down to a 0.75 inch (1.9 cm) minimum diameter.

Apparatus 10 further includes a saw system 86 which can be of a variety of conventional types. In the preferred form shown, saw system 86 is of the chain saw type including a bar 88 pivotable relative to a housing 89 which in the most preferred form is formed of plastic due to weight considerations. In the most preferred form, bar 88 is pivotable about an axis parallel to the axes defined by shafts 74 and perpendicular to the third pivot axes defined by core 64 and is pivotable in a plane parallel to the third pivot axis defined by core 64. In the preferred form, bar 88 is pivoted by a linearly extendable hydraulic actuator 90. Bar 88 carries an endless cutting chain 92, with chain 92 being .moved around bar 88 by a hydraulic rotary motor 94. Saw system 86 is suitably secured to the end of support 70 opposite to plate 72. Arms 78 of assembly 68 as shown are designed in such a way that allow them to fold and overlap each other, rendering them out of the way so that saw system 86 can be used independent of arms 78.

Now that the basic construction of apparatus 10 according to the preferred teachings of the present invention has been explained, the preferred mode of operation and some of the advantages thereof can be set forth. Specifically, as is conventional, apparatus 10 can be moved to the general area by pivoting and rotation of boom assembly 14. Assembly 68 and system 86 forming the working head 96 of apparatus 10 can then be moved relative to boom 12 to be aligned with the particular limb to be severed by movement about 3 independent axes. Specifically, head 96 can be pivoted about the horizontal pivot axis defined by pivot pin 32 by extending or retracting actuator 36.

It should then be appreciated that insert 18 according to the preferred teachings of the present invention is advantageous for several reasons. First, the use of extendable actuator 36 offers the greatest amount of torque in a compact and lightweight package. Further, boom insert 18 provides a rigid mounting surface for actuator 36 rather than attempting attachment to boom 12. Specifically, fiberglass provides an inadequate medium for mounting actuator 36. Thus, as actuator 36 is mounted to insert 18, the stress of mounting and operation of actuator 36 is not directly placed upon the fiberglass forming boom 12 in the most preferred form. Furthermore, especially with insert 18 slid within boom 12, actuator 36 can be positioned inside of insert 18 such that the operative length of apparatus 10 can be minimized as actuator 36 is positioned within the extent of boom 12 and specifically, it is not necessary for the entire length of actuator 36 to be located beyond the free end of boom 12. Additionally, locating actuator 36 inside of boom 12 maximizes the amount of rotation of plate 28 in comparison to which would be allowed if actuator 36 were located outside of boom 12. Specifically, in the most preferred form, plate 28 of mount 26 can be rotated along an arc which in the preferred form is in the order of 110° and most preferably is in the order of 180° about pivot pin 32. Further, actuator 36 located within insert 18 is protected from the environment as well as allows for a cleaner, more compact package. This is especially important in the pruning of trees around utility wires as actuator 36 positioned outside of boom 12 could have a tendency to catch on adjacent tree limbs, utility wires, and the like.

Rotary actuator 38 according to the teachings of the present invention allows rotative movement of head 96 to either side of boom 12. In particular, actuator 38 allows pivotable movement of head 96 about a second pivot axis defined by pivot pin 54 which is perpendicular to the first pivot axis defined by pivot pin 32. In the most preferred form, actuator 38 provides pivotable movement in the range of 180°. It should then be appreciated that use of rotary actuator 38 maximizes pivotal movement in a compact space and in particular the operative extent of apparatus 10 allowing movement about the second pivot axis defined by pivot pin 54 is generally equal to the diameter of rotary actuator 38 which is considerably shorter than the operative length of a linearly extendable hydraulic actuator. Additionally, the use of pivot pin 54, in the most preferred form, passing through end plates 52 of mount 48 and through the opening of actuator 38 provides additional strength to assembly 10.

Rotary actuator 58 according to the teachings of the present invention allows rotative movement of head 96 about an axis generally perpendicular to the axes defined by shafts 74 of gripping arm assembly 68 and relative to boom assembly 14. In particular, rotary actuator 58 allows pivotable movement of head 96 about a third pivot axis defined by core 64 which is perpendicular to the first pivot axis defined by pivot pin 32 and perpendicular to the second pivot axis defined by pivot pin 54. In the most preferred form, actuator 58 provides pivotable movement in the range of 360°. It should then be appreciated that the use of rotary actuator 58 maximizes pivotal movement in a compact space and in particular the operative extent of apparatus 10 allowing movement abut the third pivot axis defined by core 64 is generally equal to the axial length of rotary actuator 58 which is considerably shorter than the operative length of a linearly extendable hydraulic actuator which would also not be able to provide 360° pivotable movement as does rotary actuator 58.

It should then be appreciated that in one mode of operation, apparatus 10 can be generally positioned by pivoting of turntable 15 and booms 12 and 13 to be within the general vicinity of a limb to be cut. With gripping arms 78 in an open condition, apparatus 10 can be positioned such that main support 70 is generally parallel to and abutting with the limb or other piece of wood desired to be cut. At that time, cylinder 82 can be actuated to pivot gripping arms 78 to their closed condition to grip the limb or other piece of wood in assembly 68. It should be appreciated that abutment 84 prevents gripping arms 78 on one of the shafts 74 from moving without having movement of gripping arms 78 on the other of the shafts 74. The ability of gripping arms 78 to close separate and independent of each other allows the limb to be grasped and held without forcing the limb to the center of head 96. This is important to reduce the stress on head 96 and the limb and to create better conditions to severing the limb. The use of a single actuator 82 and abutment 84 reduces the complexity of assembly 68 according to the teachings of the present invention, which is important in the ease and expense of manufacture as well as in minimizing the weight of apparatus 10.

After gripping in assembly 68, saw system 86 can be actuated to cut the limb or other piece of wood being gripped. After being severed, the cut limb or other piece of wood is held in arm assembly 68 and can be moved to a position away from vehicle 16 by pivoting of apparatus 10 by actuating actuator 36, 38 and/or 58 and/or by pivoting of turntable 15 and booms 12 and 13. As boom assembly 14 does not carry the weight of the operator in a bucket as with conventional bucket trucks, boom assembly 14 even formed of fiberglass in the most preferred form is able to carry the weight of apparatus 10 and most severed limbs, with the preferred form of apparatus 10 minimizing its weight to thereby maximize the potential payload. Thus, is it not necessary to tie off limbs to higher limbs as was previously required. It should be appreciated that suitable provisions can be provided to allow automatic movement of boom assembly 14 and/or apparatus 10 in the event that a cut payload gripped in assembly 68 exceeds the load carrying capability of boom assembly 14 and/or apparatus 10. After the limb or other piece of wood is moved to or above the desired disposal position, actuator 82 can be retracted to move gripping arms 78 to their open condition to release the severed limb or other piece of wood.

It should then be appreciated that in addition to movement provided by boom assembly 14, apparatus 10 according to the preferred teachings of the present invention provides movement of head 96 about three perpendicular axes relative to boom assembly 14. This increased dexterity in the movement of head 96 is especially important so that head 96 can be positioned parallel to whatever the angle that the limb being severed extends from the tree. This reduces the tendency of pivotable bar 88 being pinched in the cut during cutting. Additionally, head 96 can be moved into the tree around other limbs and utility lines so that trimming of only the necessary limbs are necessary and without catching on and/or damaging adjacent limbs or utility lines. Thus, movement about three independent pivot axes is especially advantageous in the utilities industries.

The preferred construction of apparatus 10 according to the teachings of the present invention is believed to be advantageous for several reasons. First, the use of rotary actuators 38 and 58 provides a maximum range of motion without the use of complex mechanisms involving shafts, sprockets, gears, and the like. Further, the use of insert 18, the arrangement of rotary actuators 38 and 58, and the construction of mounts 26, 48, and 66 minimize the distance from the end of boom 12 and head 96 which is important to reduce torque loads on boom 12. In this regard, having the third axis defined by core 64 being perpendicular to shafts 74 and thus to actuator 82, creates a more compact design than other arrangements. Additionally, the compact and light weight of apparatus 10 allows apparatus 10 to be utilized with fiberglass booms 12 and still have the ability to hold and carry severed limbs or similar wood. It is also believed that the arrangement of mounts 26, 48, and 66 and rotary actuators 38 and 58 enhances the range of motion desired in the applications for which apparatus 10 of the present invention is intended to be utilized.

Now that the basic construction and preferred mode of operation of apparatus 10 have been set forth, a preferred control system 100 for apparatus 10 according to the preferred teachings of the present invention can be explained. Specifically, control system 100 includes a first remotely controlled valve 101 in fluid communication with motor 15a, with valve 101 in the most preferred form being of the proportional type to allow rotation in either direction at varying speeds. A second remotely controlled valve 102 is in fluid communication with hydraulic actuator 13a, with valve 102 in the preferred form being of the proportional type to allow pivoting of boom 13 in either direction at varying speeds. A third remotely controlled valve 103 is in fluid communication with actuator 12a, with valve 103 in the preferred form being of the proportional type to allow pivoting of boom 12 in either direction at varying speeds. A fourth remotely controlled valve 104 is in fluid communication with actuator 38, with the valve 104 in the preferred form being of the on/off type to allow pivoting of mount 48 in either direction generally at a constant speed when actuated. A fifth remotely controlled valve 105 is in fluid communication with actuator 36, with valve 105 in the preferred form being of the on/off type to allow pivoting of mount 26 in either direction generally at a constant speed when actuated. A sixth remotely controlled valve 106 is in fluid communication with actuator 58, with valve 106 in the preferred form being of the on/off type to allow pivoting of mount 66 in either direction generally at a constant speed when actuated. A seventh remotely controlled valve 107 is in fluid communication with actuator 82, with valve 107 in the preferred form being of the on/off type to allow actuation of actuator 82 to move gripping arms 78 in either direction generally at a constant speed when actuated. An eighth remotely controlled valve 108 is in fluid communication with hydraulic motor 94, with valve 108 in the preferred form being of the on/off type to allow actuation of motor 94 to move saw chain 92 around bar 88 at a constant speed when actuated. In the most preferred form, valve 108 is a valve section that operates in two positions, one of which actuates motor 94 and actuator 90 to pivot bar 88 away from the home position and the other which actuates actuator 90 to pivot bar 88 in the opposite direction towards the home position and without actuation of motor 94 for moving saw chain 92. Specifically, although most of the hydraulic oil discharged from motor 94 is returned to the hydraulic fluid reservoir, the return line includes a metering valve 110 for metering hydraulic oil to hydraulic actuator 90 for pivoting bar 88 away from its home position. It can then be appreciated that saw system 86 is self regulating. Specifically, if the saw chain 92 slows down from feeding too fast, motor 94 slows down and consequently slows the feed of oil to actuator 90 and that slows the pivoting of bar 88 and thus the feed of bar 88 into the wood. In the most preferred form, an emergency stop valve 109 is in fluid communication with each of the valves 101–108 to stop flow when valve 109 is actuated. The proportional control of valves 101–103 provides infinitely variable speed control which is important in control of boom assembly 14 to prevent dynamic overloading and also in offering greater control to the operator to position head 96.

In the most preferred form, valves 101–109 are located on turntable 15 for rotatable movement with boom assembly 14 and relative to vehicle 16 so that only a single rotary joint is necessary between the hydraulic fluid reservoir and pump and boom assembly 14 and apparatus 10. It should be noted that the hydraulic system can operate other accessories of vehicle 16 including but not limited to outriggers, a dump box, or the like. It should also be appreciated that suitable electrical connections are similarly provided between turntable 15 and vehicle 16 allowing relative rotation between turntable 15 and vehicle 16 but providing electrical power necessary for control system 100.

Control system 100 according to the preferred teachings of the present invention includes a remote control unit 112 which in the most preferred form is carried on the operator such as by a belt 113 to allow two hand operation. In particular, unit 112 includes a first joystick type switch 114 for operating valve 106 when moved in one direction such as back and forth and for operating valve 102 when moved in a perpendicular direction such as up and down. A second joystick type switch 116 is also provided for operating valve 104 when moved in one direction such as back and forth and for operating valve 105 when moved in a perpendicular direction such as up and down. A third joystick type switch 118 is further provided for operating valve 101 when moved in one direction such as back and forth and for operating valve 103 when moved in a perpendicular direction such as up and down. It should be appreciated that switches 114, 116 and 118 allow simultaneous movement in both directions such that two valves can be actuated simultaneously by each switch 114, 116, and 118, with actuation being dependent on the amount of movement in the particular direction in the case of proportional valve types.

Remote control unit 112 further includes a toggle type switch 119 for operating valve 107 to open and close grapple arms 78. A push button switch 120 is provided for starting control system 100. A toggle type switch 122 is provided for controlling the RPM of the motor and/or the hydraulic system of vehicle 16 and thereby the amount of hydraulic fluid flow of the hydraulic system. A push button switch 124 is provided for operating emergency stop valve 109. A push button switch 126 is provided allowing an override function which will be described in more detail hereinafter. A push button switch 128 is provided for controlling operation of valve 108 controlling saw system 86. Unit 112 further includes a LED 130 to show that unit 112 is under power.

In the most preferred form, remote control unit 112 according to the teachings of the present invention is not connected to vehicle 16, apparatus 10, and/or boom assembly 14 in a manner which creates an electrical path to ground and in the most preferred form is untethered. Specifically, in the most preferred form, remote control unit 112 includes a portable power supply 132, a control processor 134, and a transmitter 136. Power supply 132 in the preferred form is one or more batteries of either the disposable or rechargeable type. Processor 134 receives input from switches 114, 116, 118, 119, 120, 122, 124, 126 and 128 for controlling transmitter 136. Transmitter 136 in the most preferred form transmits radio signals of the desired electromagnetic frequency according to the input from switches 114, 116, 118, 119, 120, 122, 124, 126 and 128.

Control system 100 further includes a receiver 138 for receiving the radio signals transmitted by transmitter 136 and controlling the actuation of valves 101-109. In the most preferred form, receiver 138 is located on turntable 15 for rotatable movement with boom assembly 14 and relative to vehicle 16.

It should be appreciated that remote control unit 112 according to the teachings of the present invention produces several advantages. First, the operator can stand at any position relative to vehicle 16 within the range of transmitter 136 and receiver 138. In particular, the operator can stand at a position at a distance from where apparatus 10 is located such that the operator is not subject to falling debris including but not limited to saw dust, broken limbs, or the like. Further, as branches of trees can extend at different angles, the operator can stand where viewing of apparatus 10 according to the angle of the particular limb being severed, according to any visual obstructions such as but not limited to other limbs, vehicle 16, boom assembly 14, and the like. However, in addition to increasing the possibilities of the potential operator positions, an untethered remote control unit 112 has a further advantage of reducing the risk of electrocution. Specifically, in the event that apparatus 10, boom assembly 14, vehicle 16, or a severed or unsevered limb captured in head 96 should engage an electrical power line, which can be a significant risk as a preferred use is for trimming trees around power lines, the operator should stand at a sufficient distance from vehicle 16 to prevent electric shock from any electrical charge passing through boom assembly 14 and vehicle 16.

Because of the decreased risk of electrocution, apparatus 10 according to the teachings of the present invention can be utilized in unique manners. As an example, a utility pole carrying power lines can be grasped by head 96 and cut by saw system 86. After cutting and while still holding the cut portion of the utility pole, boom assembly 14 and/or turntable 15 can be moved to position the cut portion and power lines carried thereby horizontally spaced from and out of the way of the remaining portion of the utility pole. At that time, the remaining portion of the utility pole can be removed from the ground and replaced with a new utility pole. After the new utility pole is in place, the power lines can be removed from the cut pole portion and attached to the new utility pole in one of any desired manners. Thus, utility poles can be replaced without interference with existing power lines and without the need for loosening or removing the power lines from a series of utility poles utilizing apparatus 10 according to the teachings of the present invention.

Control system 100 according to the preferred teachings of the present invention further includes provisions for preventing movement of boom assembly 14 when an operational mode of saw system 86 is detected and specifically when saw bar 88 is not in its home position. In particular, a proximity switch 142 is located on housing 89 of saw system 86 to provide an electrical signal whether or not saw bar 88 is within the confines of housing 89. In the most preferred form, switch 142 senses a metal object on saw bar 88 when it is in its home position within the confines of housing 89. In the preferred form, switch 142 actuates a transmitter 144 also mounted upon housing 89. In the most preferred form, transmitter 144 is battery and solar powered so that a physical electrical connection is not necessary and transmits radio signals of the desired electromagnetic frequency. A receiver 146 receives the signals of transmitter 144 and prevents or locks out actuation of valves 101, 102, and 103 controlling movement of boom assembly 14 and in the most preferred form does not prevent actuation of valves 104–109. In the most preferred form, receiver 146 is located on turntable 15 for rotatable movement with boom assembly 14 and relative to vehicle 16. Thus, the operator is prevented from moving boom assembly 14 when saw bar 88 is not in its home position and is especially susceptible to damage. It should be appreciated that saw bar 88 from time to time can become pinched or caught on a limb and not fully retract to the home position inside of housing 89 and thereby leaving it vulnerable. The operator will still have full use of multiple degrees of movement provided by apparatus 10 and specifically by actuation of valves 104–107 to try to release saw bar 88 from its bound position. If this is not accomplished, the operator may actuate override switch 126 that will allow actuation of valves 101, 102 and 103 for moving boom assembly 14. When saw bar 88 is in its home position inside of housing 89, actuation of all valves 101–107 and 109 is permitted.

It is believed that the use of the transmitter 144 and receiver 146 according to the preferred teachings of the present invention is advantageous. Specifically, use of radio signal transmitter 144 and receiver 146 according to the preferred teachings eliminates any requirement of a physical communication connection between saw system 86 and turntable 15 which could form an electrical path from apparatus 10 down boom assembly 14 to vehicle 16 and which could be subject to stress fatigue, wear, and damage as the result of bending or engagement with other objects.

Now that the basic teachings of the present invention have been explained, many extensions and variations will be obvious to one having ordinary skill in the art. For example, although apparatus 10 of the most preferred form includes the combination of several, unique features believed to obtain synergistic results, apparatus for mounting on the free end of a boom of a boom assembly could be constructed according to the teachings of the present invention including such features singly or in other combinations. As an example, use of an untethered remote control unit 112 according to the teachings of the present invention could be utilized with other types of heads 96 and/or other manners of mounting and moving head 96 relative to boom assembly 14. Similarly, the preferred construction of assembly 68 could be utilized with other types of saw systems 86, other manners of mounting and moving head 96 relative to boom assembly 14, and other types of control systems 100, and the like.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. Apparatus for gripping and cutting attachable to a free end of a tubular boom of a boom assembly, with the tubular boom having annular cross sections, comprising, in combination: a gripping and cutting assembly; a tubular insert having first and second ends and an outer surface having annular cross sections of a size corresponding to and for a slideable fit within the free end of the tubular boom; first pivot ears formed on the first end of the tubular insert; first actuator ears secured in the tubular insert spaced from the first end; a mount having second pivot ears pivotably mounted to the first pivot ears about a first pivot axis, with the mount having second actuator ears; and an extendable actuator having a first end pivotably mounted to the first actuator ears about a second pivot axis spaced from and parallel to the first pivot axis and having a second end pivotably mounted to the second actuator ears about a third pivot axis spaced from and parallel to the first and second pivot axes and extending within the interior of the tubular insert, with the gripping and cutting assembly being mounted to the mount for pivotable movement about a fourth axis substantially perpendicular to the first pivot axis and a fifth axis substantially perpendicular to the first pivot axis and the fourth pivot axis.

2. The apparatus of claim 1 further comprising, in combination: an end plate secured to the second end of the tubular insert, with the first actuator ears extending from the end plate.

3. Apparatus for gripping and cutting attachable to a free end of a boom of a boom assembly, comprising, in combination: a gripping and cutting assembly including: first and second shafts rotatable about first and second, spaced, parallel pivot axes; a first crank arm extending radially from the first shaft; a second crank arm extending radially from the second shaft; an extendable actuator having a first end pivotably mounted to the first crank arm about a third pivot axis and having a second end pivotably mounted to the second crank arm about a fourth pivot axis spaced from and parallel to the first, second, and third pivot axes; at least a first gripping arm extending radially from the first shaft; at least a second gripping arm extending radially from the second shaft; and an abutment located equidistant between but in a plane parallel to but spaced from a plane extending between the first and second pivot axes to limit travel of the crank arms and rotational movement of the first and second shafts; with the gripping and cutting assembly being mounted to the free end of the boom of the boom assembly for pivotable movement about a first axis, a second axis substantially perpendicular to the first axis, and a third axis substantially perpendicular to the first and second axes.

4. The gripping and cutting assembly of claim 3 further comprising, in combination: an end plate, with the first and second shafts extending through and being rotatably mounted in apertures formed in the end plate, with the abutment being secured to the end plate.

5. The gripping and cutting assembly of claim 4 further comprising, in combination: a support extending perpendicularly from the end plate, with the support being parallel to and intermediate the first and second shafts; and first and second pivot brackets extending from the support spaced from the end plate, with the first shaft being pivotably mounted by the end plate and the first pivot bracket, with the second shaft being pivotably mounted by the end plate and the second pivot bracket, with the end plate located intermediate the crank arms and the gripping arms.

6. The gripping and cutting assembly of claim 5 further comprising, in combination: means for rotationally mounting the support about an axis extending generally perpendicular to the plane extending between the first and second pivot axes.

7. The apparatus of claim 3 wherein the boom assembly is moveably mounted on a vehicle; and wherein the apparatus further comprises, in combination: means carried by the vehicle for controlling the operation of the boom assembly, the pivotable movement of the gripping and cutting assembly, and the pivoting of the gripping arms; and a remotely operated control operating the controlling means and which is untethered to the vehicle during operation, with the remotely operated control including a first transmitter, and with the controlling means including a first receiver for receiving control transmissions from the first transmitter.

8. Apparatus for gripping and cutting attachable to a free end of a boom of a boom assembly, comprising, in combination: a gripping and cutting assembly; a leveler mount; a first rotary actuator rotating the leveler mount about a first axis; a head mount; and a second rotary actuator rotating the head mount relative to the leveler mount about a second axis substantially perpendicular to the first axis, with the first rotary actuator being pivotably mounted about a third axis substantially perpendicular to the first and second axes to the free end of the boom.

9. The apparatus of claim 8 wherein pivotable movement is provided 360° about one of the first, second, and third axes.

10. The apparatus of claim 8 wherein the leveler mount is generally U-shaped and includes a central plate and first and second end plates extending generally perpendicular from the central plate, with the first rotary actuator received between the end plates and the first axis extending through the end plates; and wherein the second rotary actuator is mounted between the head mount and the central plate; and wherein the head mount is directly secured to the gripping and cutting assembly.

11. The apparatus of claim 10 wherein the head mount is pivotable 360° about the second axis.

12. The apparatus of claim 10 further comprising, in combination: a rotator mount, with the first rotary actuator being mounted to the rotator mount; and means for pivotally mounting the rotator mount to the free end of the boom of the boom assembly for pivotable movement about the third pivot axis.

13. The apparatus of claim 12 wherein the boom of the boom assembly is tubular; and wherein the means for pivotally mounting the rotator mount comprises, in combination: a tubular insert having first and second ends and an outer surface having annular cross sections of a size corresponding to and for a slideable fit within the free end of the tubular boom; first pivot ears formed on the first end of the tubular insert; first actuator ears secured in the tubular insert spaced from the first end, with the rotator mount having second pivot ears pivotably mounted to the first pivot ears about the third axis, with the rotator mount having second actuator ears; and an extendable actuator having a first end pivotably mounted to the first actuator ears about a fourth pivot axis spaced from and parallel to the third axis and having a second end pivotably mounted to the second actuator ears about a fifth pivot axis spaced from and parallel to the third and fourth axes and extending within the interior of the tubular insert.

14. The apparatus of claim 10 wherein the gripping and cutting assembly comprises, in combination: a saw system of the chain saw type including a bar pivotable about an axis perpendicular to the second axis and in a plane parallel to the second axis.

15. The apparatus of claim 14 wherein the gripping and cutting assembly comprises, in combination: first and second shafts rotatable about spaced, parallel pivot axes; a first crank arm extending radially from the first shaft; a second crank arm extending radially from the second shaft; an extendable actuator having a first end pivotably mounted to the first crank arm about a pivot axis and having a second end pivotably mounted to the second crank arm about a pivot axis spaced from and parallel to the pivot axes of the first and second shafts and of the first end of the extendable actuator; at least a first gripping arm extending radially from the first shaft; at least a second gripping arm extending radially from the second shaft; and an abutment located equidistant between but in a plane parallel to but spaced from a plane extending between the pivot axes of the first and second shafts to limit travel of the crank arms and rotational movement of the first and second shafts.

16. The apparatus of claim 15 wherein the boom assembly is moveably mounted on a vehicle; and wherein the apparatus further comprises, in combination: means carried by the vehicle for controlling the operation of the boom assembly, the pivotable movement of the gripping and cutting assembly, the pivoting of the gripping arms, and the operation of the saw system; a remotely operated control operating the controlling means and which is untethered to the vehicle during operation, with the remotely operated control including a first transmitter, and the controlling means including a first receiver for receiving control transmissions from the first transmitter.

17. The apparatus of claim 16 wherein the saw system includes a sensor for detecting an operational mode of the saw system, with the controlling means including an interlock for preventing operation of the boom assembly when the operational mode of the saw system is detected by the sensor.

18. The apparatus of claim 8 wherein the boom assembly is moveably mounted on a vehicle; and wherein the apparatus further comprises, in combination: means carried by the vehicle for controlling the operation of the boom assembly, the pivotable movement of the gripping and cutting assembly, and the gripping and cutting apparatus; and a remotely operated control operating the controlling means and which is untethered to the vehicle during operation, with the remotely operated control including a first transmitter, and with the controlling means including a first receiver for receiving control transmissions from the first transmitter.

19. The apparatus of claim 18 wherein the gripping and cutting assembly comprises a saw system and a sensor for detecting an operational mode of the saw system, with the controlling means including an interlock for preventing operation of the boom assembly when the operational mode of the saw system is detected by the sensor.

20. Apparatus for gripping and cutting comprising, in combination: a moveable boom assembly mounted on a vehicle, with the boom assembly including a boom having a free end; a gripping and cutting apparatus mounted to the free end of the boom of the boom assembly, with the gripping and cutting apparatus being pivotably moveable about first axis , a second axis substantially perpendicular to the first axis, and a third axis substantially perpendicular to the first and second axes, with the gripping and cutting apparatus including pivotable gripping arms and a saw system; means carried by the vehicle for controlling the operation of the boom assembly, the pivotable movement of the gripping and cutting apparatus, the pivoting of the gripping arms, and the operation of the saw system; and a remotely operated control operating the controlling means and which is untethered to the vehicle during operation, with the remotely operated control including a first transmitter, and with the controlling means including a first receiver for receiving control transmissions from the first transmitter.

21. The gripping and cutting apparatus of claim 20 wherein the saw system includes a sensor for detecting an operational mode of the saw system, with the controlling means including an interlock for preventing operation of the boom assembly when the operational mode of the saw system is detected by the sensor.

22. The gripping and cutting apparatus of claim 21 further comprising, in combination: a second transmitter carried by the saw system for providing a signal when the operational mode is detected; and a second receiver for receiving the signal provided by the second transmitter for controlling the interlock.

23. Apparatus for gripping and cutting comprising, in combination: a moveable boom assembly mounted on a vehicle, with the boom assembly including a boom having a free end; a gripping and cutting apparatus mounted to the free end of the boom of the boom assembly for pivotable movement about a first axis, a second axis substantially perpendicular to the first axis, and a third axis substantially perpendicular to the first and second axes, with the gripping and cutting apparatus including a sensor for detecting an operational mode of the gripping and cutting apparatus; and means for controlling the operation of the boom assembly and the operation of the gripping and cutting apparatus, with the controlling means including an interlock for preventing operation of the boom assembly when the operational mode of the gripping and cutting apparatus is detected by the sensor.

24. Apparatus for gripping and cutting attachable to a free end of a tubular boom of a boom assembly mounted on a vehicle, comprising, in combination: a gripping and cutting assembly comprising, in combination: first and second shafts rotatable about first and second, spaced, parallel pivot axes, a first crank arm extending radially from the first shaft, a second crank arm extending radially from the second shaft, an extendable actuator having a first end pivotably mounted to the first crank arm about a third pivot axis and having a second end pivotably mounted to the second crank arm about a fourth pivot axis spaced from and parallel to the first, second, and third pivot axes, at least a first gripping arm extending radially from the first shaft, at least a second gripping arm extending radially from the second shaft, an abutment located equidistant between but in a plane parallel to but spaced from a plane extending between the first and second pivot axes to limit travel of the crank arms and rotational movement of the first and second shafts, and a saw system of the chain saw type including a bar pivotable abut an axis parallel to the first and second axes; means for mounting the gripping and cutting assembly to the free end of the tubular boom of the boom assembly for pivotable movement about a fifth axis, a sixth axis substantially perpendicular to the fifth axis, and a seventh axis substantially perpendicular to the fifth and sixth axes, with the mounting, means including a tubular insert having first and second ends and an outer surface having annular cross sections of a size corresponding to and for a slideable fit within the free end of the tubular boom, first pivot ears formed on the first end of the tubular insert, first actuator ears secured in the tubular insert spaced from the first end, a mount having second pivot ears pivotably mounted to the first pivot ears about the fifth pivot axis, with the mount having second actuator ears, and an extendable actuator having a first end pivotably mounted to the first actuator ears about an eighth pivot axis spaced from and parallel to the fifth pivot axis and having a second end pivotably mounted to the second actuator ears about a ninth pivot axis spaced from and parallel to the fifth and eighth pivot axes; means carried by the vehicle for controlling the operation of the boom assembly, the pivotable movement of the gripping and cutting assembly, the pivoting of the gripping arms, and the operation of the saw system; and a remotely operated control operating the controlling means and which is untethered to the vehicle during operation, with the remotely operated control including a first transmitter, and the controlling means including a first receiver for receiving control transmissions from the first transmitter; wherein the saw system includes a sensor for detecting an operational mode of the saw system, with the controlling means further including an interlock for preventing operation of the boom assembly when the operational mode of the saw system is detected by the sensor.

25. Apparatus for gripping and cutting attachable to a free end of a boom of a boom assembly, comprising, in combination: a gripping and cutting assembly including a head mount; a leveler mount; a first rotary actuator mounted to the free end of the boom of the boom assembly and rotating the leveler mount relative to the boom about a first axis; and a second rotary actuator rotating the head mount and the gripping and cutting assembly relative to the leveler mount about a second axis.

26. The apparatus of claim 25 wherein the leveler mount is generally U-shaped and includes a central plate and first and second end plates extending generally perpendicular from the central plate, with the first rotary actuator received between the end plates and the first axis extending through the end plates; and wherein the second rotary actuator is mounted between the head mount and the central plate; and wherein the head mount is directly secured to the gripping and cutting assembly.

27. The apparatus of claim 26 with the first rotary actuator being mounted to the free end of the boom of the boom assembly by a rotator mount, with the first rotary actuator being mounted to the rotator mount, with the rotator mount being mounted to the free end of the boom of the boom assembly for pivotable movement about a third axis.

28. The apparatus of claim 27 with the second axis being perpendicular to the first axis and with the third axis being perpendicular to the first and second axes.

29. The apparatus of claim 25 wherein the boom assembly is moveably mounted on a vehicle; and wherein the apparatus further comprises, in combination: means carried by the vehicle for controlling the operation of the boom assembly, the first and second rotary actuators, and the gripping and cutting apparatus; and a remotely operated control operating the controlling means and which is untethered to the vehicle during operation, with the remotely operated control including a first transmitter, and with the controlling means including a first receiver for receiving control transmissions from the first transmitter.

30. The apparatus of claim 29 wherein the gripping and cutting assembly comprises a saw system and a sensor for detecting an operational mode of the saw system, with the controlling means including an interlock for preventing operation of the boom assembly when the operational mode of the saw system is detected by the sensor.

* * * * *